United States Patent
Yonekawa

(10) Patent No.: US 9,471,099 B2
(45) Date of Patent: Oct. 18, 2016

(54) CONTAINER, IMAGE FORMING APPARATUS, AND ELECTRONIC DEVICE

(71) Applicant: Masahiro Yonekawa, Tokyo (JP)

(72) Inventor: Masahiro Yonekawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 338 days.

(21) Appl. No.: 13/679,098

(22) Filed: Nov. 16, 2012

(65) Prior Publication Data

US 2013/0140409 A1   Jun. 6, 2013

(30) Foreign Application Priority Data

Dec. 2, 2011   (JP) ................................. 2011-264331

(51) Int. Cl.
| | |
|---|---|
| *G06F 1/16* | (2006.01) |
| *F16L 3/02* | (2006.01) |
| *F16L 3/26* | (2006.01) |
| *H04R 1/10* | (2006.01) |
| *B41J 29/16* | (2006.01) |
| *B65H 75/00* | (2006.01) |
| *B65H 75/36* | (2006.01) |

(Continued)

(52) U.S. Cl.
CPC .............. *G06F 1/1607* (2013.01); *B41J 29/02* (2013.01); *B41J 29/16* (2013.01); *B65H 75/00* (2013.01); *B65H 75/366* (2013.01); *F16L 3/02* (2013.01); *F16L 3/26* (2013.01); *G03G 21/1619* (2013.01); *G06F 1/1611* (2013.01); *H04R 1/1033* (2013.01); *B65H 2701/34* (2013.01); *G03G 21/1652* (2013.01)

(58) Field of Classification Search
CPC ............ B65H 2701/34; B65H 75/366; G03G 21/1652; H04R 1/1033; B41J 29/16; G06F 1/1607; G06F 1/1611; F16L 3/02; F16L 3/26

USPC .................................................... 248/65, 146
See application file for complete search history.

(56) References Cited

U.S. PATENT DOCUMENTS

| | | | | |
|---|---|---|---|---|
| 5,409,107 | A | * | 4/1995 | Browne ......................... 206/305 |
| 6,057,936 | A | | 5/2000 | Obara et al. |
| 6,233,791 | B1 | * | 5/2001 | Theis ........................... 24/135 R |

(Continued)

FOREIGN PATENT DOCUMENTS

| | | |
|---|---|---|
| JP | 61-083669 | 6/1986 |
| JP | S61-179775 A | 11/1986 |

(Continued)

OTHER PUBLICATIONS

Office Action issued Sep. 29, 2015, in Japanese Patent Application No. 2011-264331.

*Primary Examiner* — Eret McNichols
(74) *Attorney, Agent, or Firm* — Oblon, McClelland, Maier & Neustadt, L.L.P.

(57) ABSTRACT

A container, disposed on an external side surface of an apparatus housing, to contain a cable therein, includes a guide part to guide a cable extending from an interior of the apparatus housing. The guide part may be formed by extending downward from a part of the container to serve as a regulation part to regulate movement of the cable. The end of the regulation part may be further bent upward from a part of the container to support the cable from below. The guide part is further formed into a loading part to load the cable inside the container or further includes a divider. As such, the guide part may be formed into various shapes for effectively use an internal and external space of the apparatus.

14 Claims, 5 Drawing Sheets

(51) Int. Cl.
*B41J 29/02* (2006.01)
*G03G 21/16* (2006.01)

(56) References Cited

U.S. PATENT DOCUMENTS

| | | | |
|---|---|---|---|
| 6,449,145 B1* | 9/2002 | Buller et al. | 361/679.59 |
| 6,613,981 B1* | 9/2003 | Hathcock et al. | 174/69 |
| 6,816,364 B2* | 11/2004 | Helot et al. | 361/679.06 |
| 7,068,907 B2 | 6/2006 | Schray | 385/135 |
| 7,088,577 B2* | 8/2006 | Lauffer et al. | 361/679.21 |
| 7,455,267 B2* | 11/2008 | Kim | 248/65 |
| 7,822,310 B2* | 10/2010 | Castonguay et al. | 385/135 |
| 7,854,420 B2* | 12/2010 | Depay et al. | 248/316.7 |
| 7,952,865 B2* | 5/2011 | Bao | 361/679.4 |
| 7,983,029 B2* | 7/2011 | Park | 361/679.22 |
| 8,042,365 B2* | 10/2011 | Morrison et al. | 70/58 |
| 8,194,396 B2* | 6/2012 | Kano | 361/623 |
| 8,622,354 B2* | 1/2014 | Sakata | 248/133 |
| D710,363 S* | 8/2014 | Wengreen | D14/432 |
| 8,848,113 B2* | 9/2014 | Wengreen et al. | 348/836 |
| 8,939,417 B1* | 1/2015 | Wengreen | 248/311.2 |
| 8,988,616 B2* | 3/2015 | Wengreen et al. | 348/836 |
| 9,042,702 B2* | 5/2015 | Rodriguez et al. | 385/136 |
| 9,131,195 B2* | 9/2015 | Wengreen et al. | |
| 2002/0043910 A1 | 4/2002 | Hashimoto et al. | |
| 2005/0141180 A1* | 6/2005 | Umeda et al. | 361/681 |
| 2005/0211861 A1* | 9/2005 | Lee et al. | 248/309.1 |
| 2005/0213290 A1* | 9/2005 | Lauffer et al. | 361/681 |
| 2006/0082622 A1 | 4/2006 | Yonekawa et al. | |
| 2007/0071492 A1 | 3/2007 | Ito | |
| 2007/0120024 A1* | 5/2007 | Oddsen et al. | 248/122.1 |
| 2007/0139506 A1 | 6/2007 | Yonekawa | |
| 2007/0140708 A1 | 6/2007 | Yonekawa et al. | |
| 2007/0140731 A1 | 6/2007 | Yonekawa | |
| 2007/0236552 A1 | 10/2007 | Suzuki et al. | |
| 2008/0099636 A1* | 5/2008 | Depay et al. | 248/74.2 |
| 2008/0100872 A1* | 5/2008 | Ito | 358/296 |
| 2008/0116157 A1* | 5/2008 | Fulbrook et al. | 211/60.1 |
| 2008/0246826 A1 | 10/2008 | Yonekawa | |
| 2009/0294599 A1* | 12/2009 | Chen et al. | 248/65 |
| 2010/0013901 A1 | 1/2010 | Yonekawa et al. | |
| 2010/0319157 A1* | 12/2010 | Lee et al. | 15/323 |
| 2011/0068043 A1* | 3/2011 | Kano | 206/702 |
| 2011/0203954 A1* | 8/2011 | Kroupa | 206/320 |
| 2012/0080565 A1* | 4/2012 | Gallup | 248/68.1 |
| 2012/0256031 A1* | 10/2012 | Flack | 242/370 |
| 2012/0273245 A1* | 11/2012 | Kano | 174/60 |
| 2013/0126661 A1* | 5/2013 | Detweiler | 242/550 |
| 2013/0193253 A1* | 8/2013 | Sarver | 242/400.1 |
| 2014/0061406 A1* | 3/2014 | Chevalier et al. | 248/205.1 |
| 2014/0065875 A1* | 3/2014 | Frenkil, Sr. | 439/501 |
| 2014/0153182 A1* | 6/2014 | North et al. | 361/679.41 |
| 2016/0037910 A1* | 2/2016 | Ergun | G06F 1/1607 |
| | | | 361/679.26 |

FOREIGN PATENT DOCUMENTS

| | | |
|---|---|---|
| JP | 2002-002058 | 1/2002 |
| JP | 2003-066668 | 3/2003 |
| JP | 2004-061957 | 2/2004 |
| JP | 2007-83672 | 4/2007 |
| JP | 2011-064804 | 3/2011 |

* cited by examiner

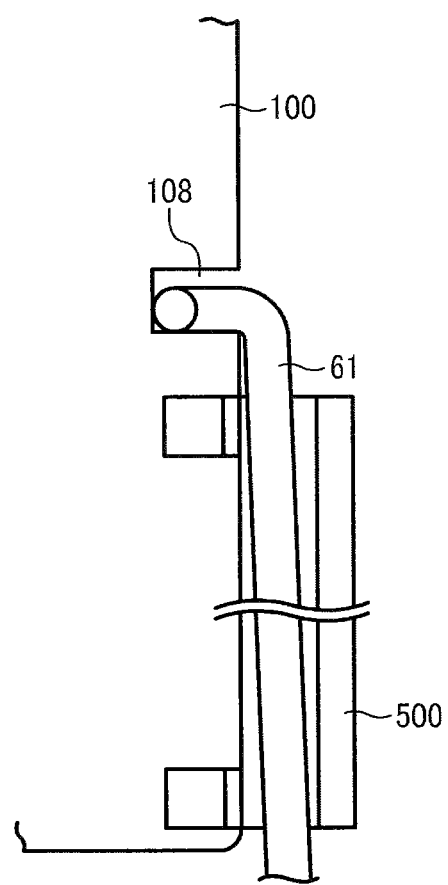

CONTAINER, IMAGE FORMING APPARATUS, AND ELECTRONIC DEVICE

CROSS-REFERENCE TO RELATED APPLICATION

The present application claims priority from Japanese patent application number 2011-264331, filed on Dec. 2, 2011, the entire disclosure of which is incorporated by reference herein.

BACKGROUND OF THE INVENTION

1. Field of the Invention

The present invention relates to an image forming apparatus such as a copier, a printer, a facsimile machine, or a multi-function apparatus having one or more capabilities of the above devices, and in particular to a structure of a container for cables or the like disposed on an external surface of a housing of the apparatus, and to an image forming apparatus and an electronic device including such a container.

2. Description of the Related Art

A cable or the like extending from an interior of the apparatus such as an image forming apparatus to an outside thereof needs to be disposed so as not to be caught between the apparatus housing and a wall. Typically, a structure is adopted in which a concave portion is formed in an external surface of the apparatus housing and the cable is run in the concave portion.

Other possibilities include a structure in which a container to store a user manual for the apparatus or small things is disposed on a side surface of the apparatus housing, or a configuration in which the container is a separate member is attached to the apparatus housing.

As described above, when the concave portion to run the cables around an external surface of the apparatus housing is so formed as to slot into the housing, a space inside the housing to allocate necessary components becomes narrower, or otherwise, any protrusion inside the housing becomes an obstacle to the storage of the components. Accordingly, even though the formation of the concave portion is not a requirement, its range, including a length, depth, and position of the concave portion, preferably should be as small as possible.

In addition, when the cable is provided on the bottom of the housing, because the cable-disposed portion is not visible, strict attention should be paid so as not to cause the cable to be caught between the bottom of the housing and the floor or cause any trouble when the apparatus is moved.

SUMMARY OF THE INVENTION

The present invention provides a container, disposed on an external side surface of an apparatus housing, to contain a cable therein, including an extended part extending from a side surface of the apparatus housing toward outside. In the container, the extended part includes a guide member to contain and guide the cable extending from an interior of the apparatus housing.

Accordingly, the space of the container for the cables extending to an outside of the apparatus housing is used as a laying space of the cable, and the space inside the apparatus housing is prevented from becoming narrower and as many components as possible of the apparatus can be installed inside the apparatus and the cable is effectively allocated outside the apparatus.

These and other objects, features, and advantages of the present invention will become apparent upon consideration of the following description of the preferred embodiments of the present invention when taken in conjunction with the accompanying drawings.

BRIEF DESCRIPTION OF THE DRAWINGS

FIG. 7 is a cross-sectional view of a container according to a fourth embodiment of the present invention.

DESCRIPTION OF THE PREFERRED EMBODIMENTS

Figure 1:
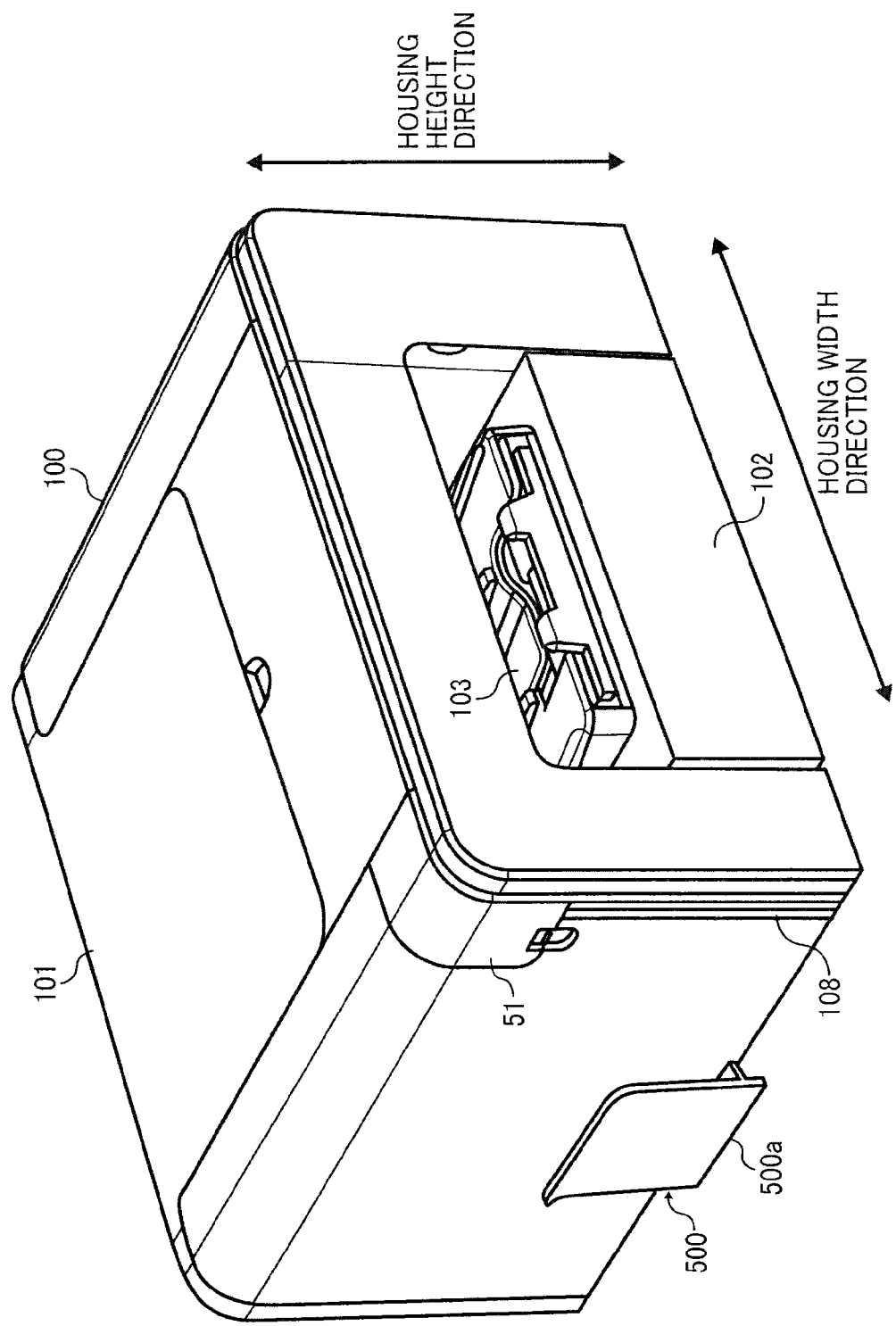
FIG. 1 is an external oblique view of an image forming apparatus according to a first embodiment of the present invention.

Preferred embodiments of the present invention will now be described with reference to accompanying drawings, in which identical reference numerals indicate the same or similar components through and redundant explanation is omitted.

In the description of the present invention, the term "apparatus housing" includes various devices, mechanisms, and structures therein, and the term "apparatus housing" means a member to form an external surface of the apparatus housing such as a casing or covering member and a structure which can be seen from an external. The apparatus housing does not include any other parts or components existing inside the apparatus even though such parts or components are connected to the apparatus housing.

First Embodiment

Figure 2:
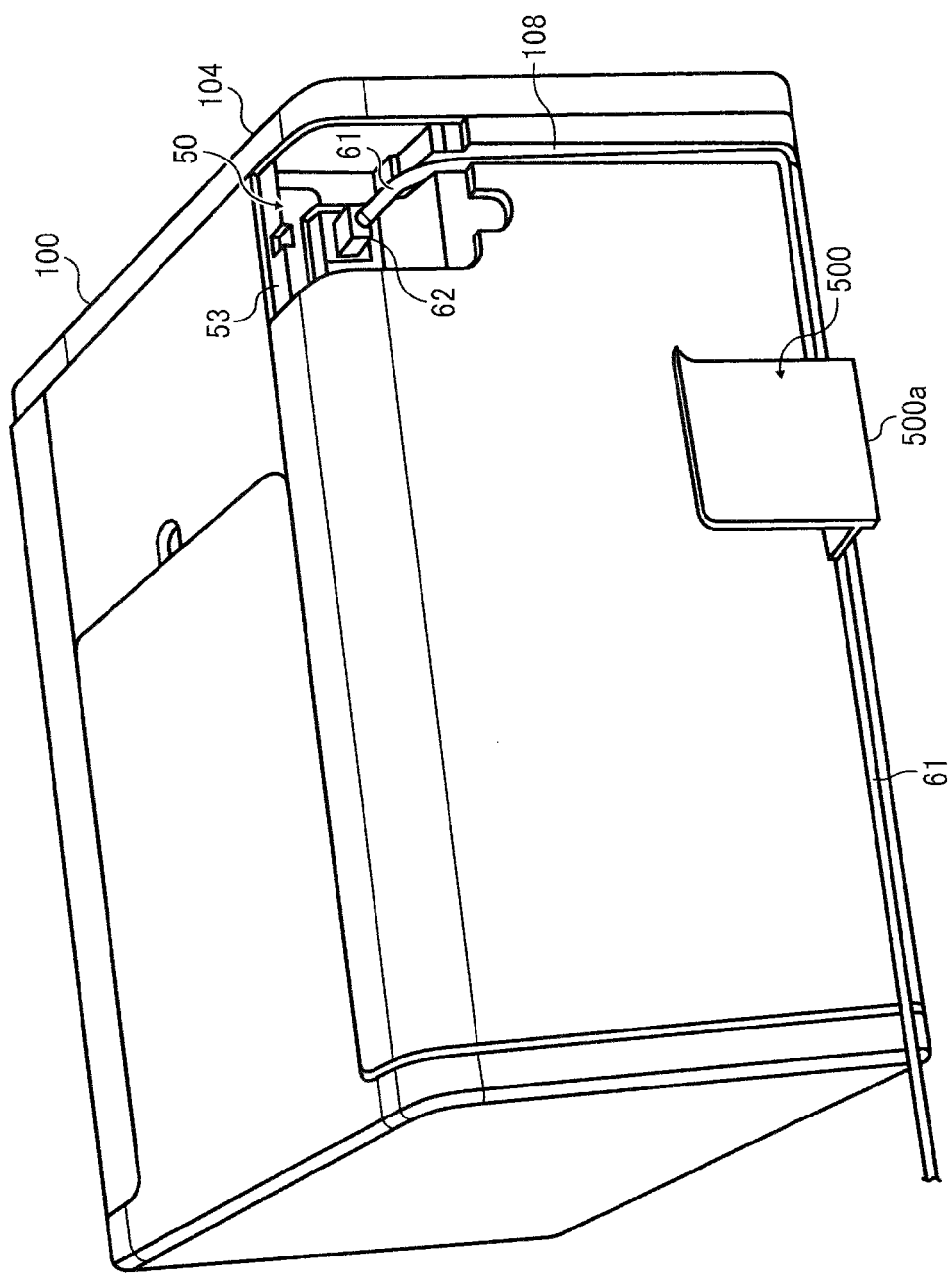
FIG. 2 is an oblique view of the image forming apparatus of FIG. 1 illustrating a use of an external device via a USB cable.
Figure 3:
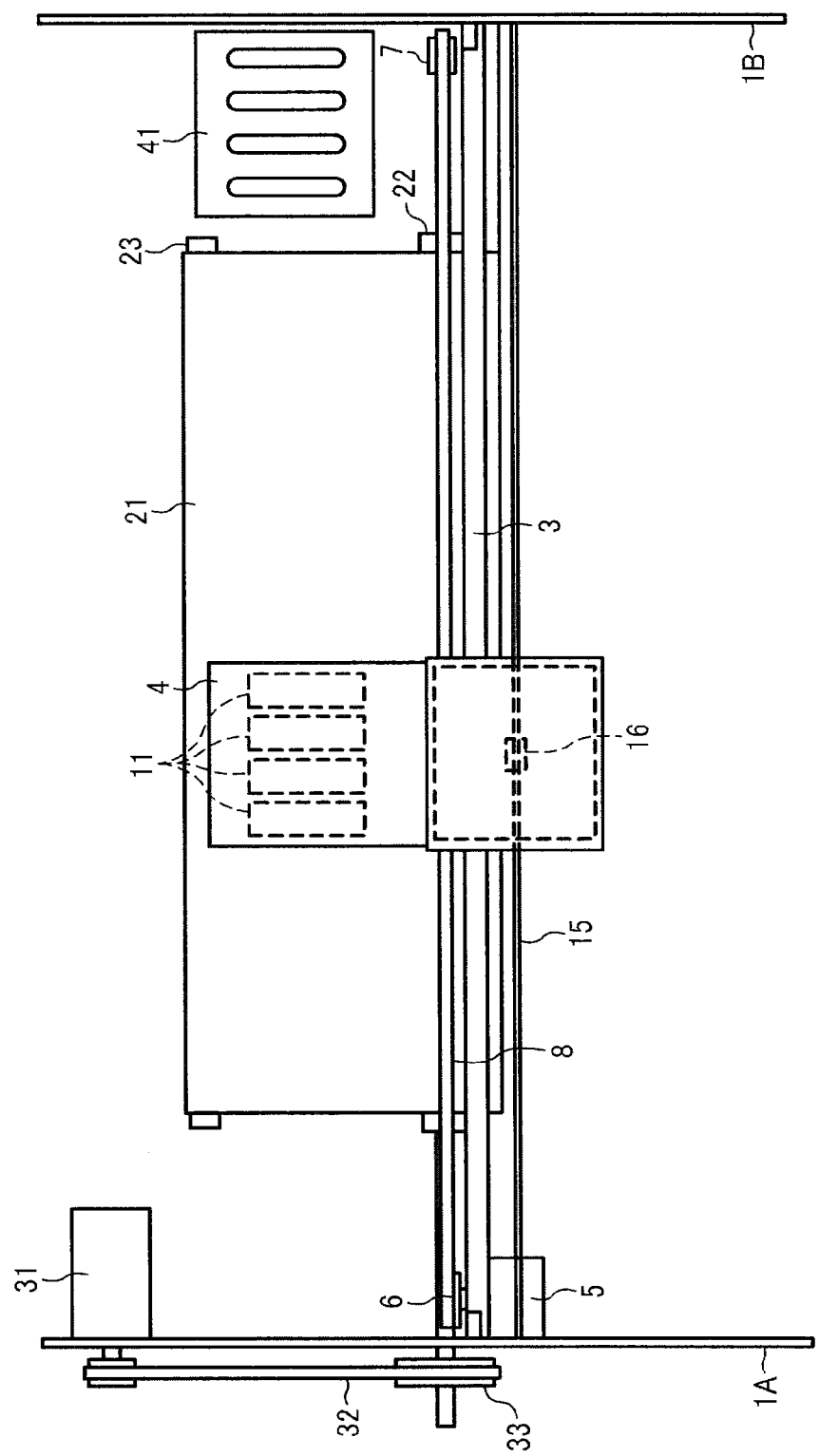
FIG. 3 is a view illustrating an internal structure of the image forming apparatus of FIGS. 1 and 2.

FIGS. 1 and 2 are external oblique views of an image forming apparatus, on an external surface of which a cable is run according to a first embodiment of the present invention. FIG. 3 is a view illustrating an internal structure of the image forming apparatus of FIGS. 1 and 2. In the present embodiment, the image forming apparatus is a serial-type inkjet printer, including an apparatus housing 100 and a cover 101 disposed openably on an upper surface of the apparatus housing 100. By opening the cover 101, an internal structure of the apparatus can be accessed. As illustrated in FIGS. 1 and 2, a sheet feed tray 102 to contain sheets is disposed at a bottom of the apparatus in FIGS. 1 and 2. The sheet tray 102 is openable from the back to front in FIG. 1 and rightward in FIG. 2. In addition, a sheet discharge tray 103 to receive a recording medium on which an image is formed is disposed above the sheet feed tray 102. The recording media or sheets stacked on the sheet discharge tray 103 can be taken from an opening in front of the apparatus.

As illustrated in FIGS. 1 and 2, a container 500 capable of storing a booklet such as a user's operating manual is disposed on the side surface of the apparatus housing 100 of the printer. The container 500 protrudes from the external surface of the apparatus housing 100. Although in the present embodiment the container 500 is configured as a rack, it is not limited to such a configuration and alternatively may be configured as a box open at the top or the like.

FIG. 2 is an oblique view of the image forming apparatus illustrating a state of use of an external device via a USB cable. In order to output an image from the printer, an external PC and the printer is connected with a cable so that output signals from the PC can be transmitted to the printer. A connector 50 for wired connection is disposed to the printer. As illustrated in FIG. 2, the connector 50 is disposed inside a detachable connector cover (see FIG. 1). For simplicity of description, FIG. 2 does not show the connector cover 51.

As illustrated in FIG. 3, this image forming apparatus includes main side plates 1A and 1B, a guide member 3 disposed laterally on the main side plates 1A and 1B, a carriage 4 so supported by the guide member 3 to be slidably movable in the main scanning direction, a driving pulley 6 and a driven pulley 7, a timing belt 8 stretched between the driving pulley 6 and the driven pulley 7 so that the carriage 4 is scanned while being driven via the timing belt 8 stretched between the driving pulley 6 and the driven pulley 7, both driven by a main scan motor 5. A recording head unit (or simply a recording head) 11 including a liquid discharge head to discharge liquid droplets of each color of yellow (Y), cyan (C), magenta (M), or black (K) to form an image and a head tank to supply ink to the liquid discharge head is mounted on the carriage 4. The liquid discharge head includes nozzle arrays each including a plurality of nozzles and each nozzle array is aligned in a sub-scanning direction perpendicular to the main scanning direction, with the ink droplet discharging direction oriented downward. The plurality of recording heads 11 are supported by a head holder, not shown, so as to be integrated as a unit and is mounted on the carriage 4.

An encoder scale 15 is disposed along the main scanning direction of the carriage 4 and an encoder scale 16 formed of a transmission-type photosensor to read a scale serving as a position identifier of the encoder scale 15 is disposed on the carriage 4. The encoder scale 15 and the encoder scale 16 constitute a linear encoder to serve as a position detector.

A conveyance belt 21 to convey the recording medium, not shown, in the sub-scanning direction is disposed below the carriage 4. The conveyance belt 21 is an endless belt which is stretched between a conveyance roller 22 and a tension roller 23, and is caused to rotate in the sub-scanning direction driven by the rotation of the conveyance roller 22 via a timing belt 32 and a timing pulley 33 driven by a sub-scan motor 31.

Further, a maintenance unit 41 to maintain the nozzles of the recording heads 11 in good condition is disposed at one side of the conveyance belt 21 and at one side in the main scanning direction of the carriage 4. The maintenance unit 41 includes for example a cap member to cap the nozzle face of the recording head 11; a wiper to clean the nozzle face; and a dummy discharge receiver to receive droplets not contributing to the image formation.

In the thus-configured printer, the fed recording medium is intermittently conveyed by the conveyance belt 21, and the recording head 11 is driven in response to an image signal while moving the carriage 4 in the main scanning direction so as to discharge liquid droplets onto the stopped recording medium to record a single line. After the recording medium has been conveyed by a predetermined distance, recording of a next line is performed and the similar operation is repeated to form an image on the recording medium. After the image formation, the recording medium is ejected to outside.

Further, in the present embodiment, a cable 61 connected to the connection port of the connector 50 which appears when the connector cover 51 is removed is guided along a guide groove 108, is changed direction orthogonally or substantially orthogonally around a bottom of the apparatus housing 100, and is guided to a bottom of the container 500 along a side surface of the apparatus housing 100.

Figure 4A:
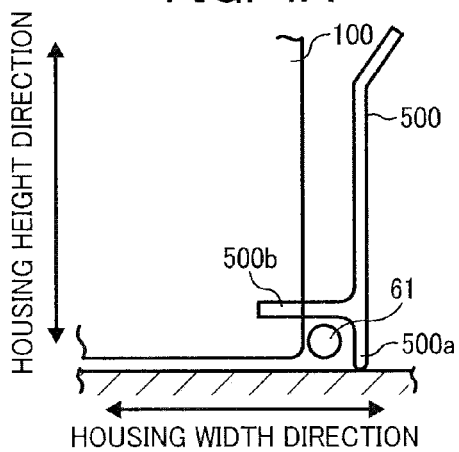
FIGS. 4A and 4B are cross-sectional views of a container in the first embodiment of the present invention.
Figure 4B:
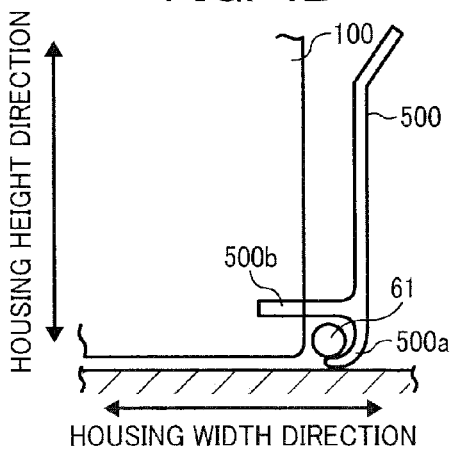

FIGS. 4A and 4B are cross-sectional views of a container 500 in the first embodiment of the present invention.

FIG. 4A shows a case in which a positioning part for the cable 61 is disposed at a bottom of the container 500. Specifically, a rising part of the outermost surface of the container 500 is extended downward and the extended part is set as a regulation part 500a and a bottom surface of a loading part 500b which forms the floor of the container 500 is set as a positioning part. This positioning part serves as a container for the cable 61 and prevents the cable 61 from moving to a direction separating from the side surface of the apparatus housing 100, and has similar positioning effect as that of which the concave groove exerts on the cable 61 to regulate its position and bind the cable 61 to the bottom surface. More specifically, the regulation part 500a regulates the position of the cable 61 in the width direction of the housing between the side surface of the apparatus housing 100 and the container 500 and the loading part 500b regulates the position of the cable 61 in the height direction of the housing together with the floor surface on which the image forming apparatus is placed. In the embodiment as illustrated in FIG. 4A, the regulation part 500a and the loading part 500b form a guide part to guide the cable 61. With this structure, the cable 61 can be guided and contained inside the dimensions (i.e., within the depth of the container 500 as illustrated in FIGS. 4A and 4B) of the container 500 protruding from the apparatus housing 100. Thus, the dead space due to the existence of the container 500 may be effectively used. When removing the cable 61, it is only necessary to lift up the image forming apparatus itself or incline the image forming apparatus slightly so as to make a space below the regulation part 500a. The removal of the cable 61 can be easily made because of this uncomplicated structure.

FIG. 4B shows a case in which an end of the regulation part 500a disposed at the bottom of the container 500 is bent up toward the apparatus housing 100 to form the regulation part, so that the cable 61 is held by the wound-up end of the regulation part 500a. More specifically, the regulation part 500a regulates the position of the cable 61 in the width direction of the apparatus housing 100 between the side surface of the apparatus housing 100 and the container 500 and the loading part 500b regulates the position of the cable 61 in the height direction of the apparatus housing 100 together with the regulation part 500a. In the embodiment as illustrated in FIG. 4B, the regulation part 500a and the loading part 500b form a guide part to guide the cable 61. Because the cable 61 is held from the bottom, when the apparatus housing 100 is installed at a desired or predetermined installation site, the cable 61 is prevented from being sandwiched between the bottom surface of the apparatus housing 100 and the surface of the installation site.

In the present embodiment, because the cable-disposed portion is visible, any trouble caused by being caught between the bottom surface of the apparatus housing 100 and the surface of the installation site can be prevented, installation of the apparatus can be performed easily, and moving the apparatus can be done without any trouble.

Second Embodiment

Figure 5A:
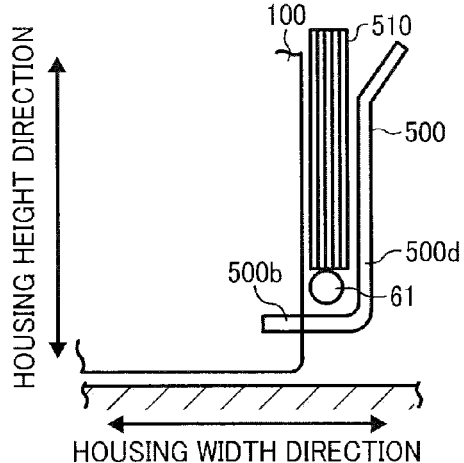
FIGS. 5A and 5B are cross-sectional views of a container according to a second embodiment of the present invention.
Figure 5B:
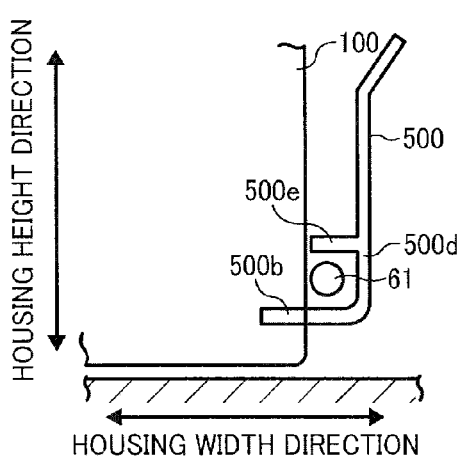

FIGS. 5A and 5B are cross-sectional views of the container 500 in a second embodiment of the present invention.

The positioning part of the cable 61 according to the second embodiment is disposed at an upper surface of the loading part 500b of the container 500.

As illustrated in FIG. 5A, the floor of the container 500 is used as a positioning part of the cable 61. Then, the leaflet 510 such as an operating manual to be contained inside the container 500 is placed on the cable 61. Even without placing the leaflet 500 thereon, a wall 500d of the container 500 prevents the cable 61 from moving to a direction separating from the side surface of the apparatus housing 100 and has similar effect of positioning which the concave groove exerted to the cable 61 to regulate its position and fix the cable 61 to the bottom surface. When the leaflet 510 is placed on the cable 61, the position of the cable 61 in the height direction of the housing is regulated between the leaflet 510 and the loading part 500b. The wall 500d regulates the position of the cable 61 in the width direction of the apparatus housing together with the side wall of the apparatus housing 100. In the embodiment as illustrated in FIG. 5A, at least the wall 500d serves as a guide part to guide the cable 61. If the leaflet 510 is of the normal size, a height sufficient to put the leaflet 510 is available at an upper part of the cable 61, and the cable 61 does not exceed the height. Accordingly, waving of the cable 61 to outside the container 500 can be prevented. As illustrated in FIG. 5A, if the leaflet 510 is placed from above, waving of the cable 61 in the vertical direction can be prevented. In removing the cable 61, because the leaflet 510 is first pulled out of the container 500 and the cable 61 is similarly pulled out upward, thereby realizing a very simple structure.

FIG. 5B shows a case in which a divider 500e is constructed above the cable 61 placed on the loading part 500b of the container 500. With this structure, any stress and damage of the cable 61 due to the leaflet 510 placed thereon can be prevented. More specifically, the divider 500c divides a space surrounded by the wall 500d, the container 500 including the loading part 500b, and the side surface of the apparatus housing 100, into two. The divider 500e is located above the loading part 500b and is extended from the wall 500d toward the side surface of the apparatus housing 100. The cable 61 is guided and is contained between the loading part 500b and the divider 500e. The position of the cable 61 is regulated in the height direction of the apparatus housing between the loading part 500b and the divider 500e. Further, the position of the cable 61 in the width direction of the apparatus housing 100 is regulated between the side surface of the apparatus housing and the wall 500d. In the embodiment as illustrated in FIG. 5B, the loading part 500b, the divider 500e, and the wall 500d form a guide part to guide the cable 61.

Third Embodiment

Figure 6A:
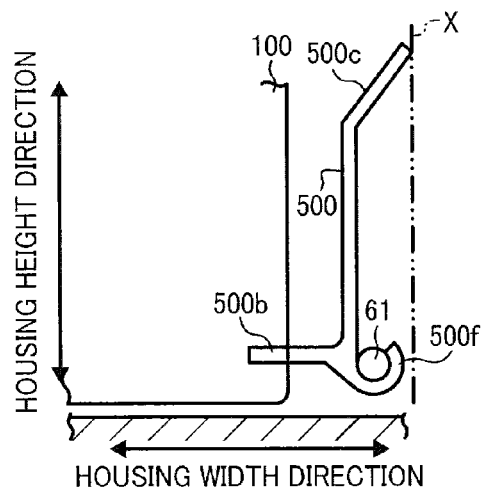
FIGS. 6A and 6B are cross-sectional views of a container according to a third embodiment of the present invention.
Figure 6B:
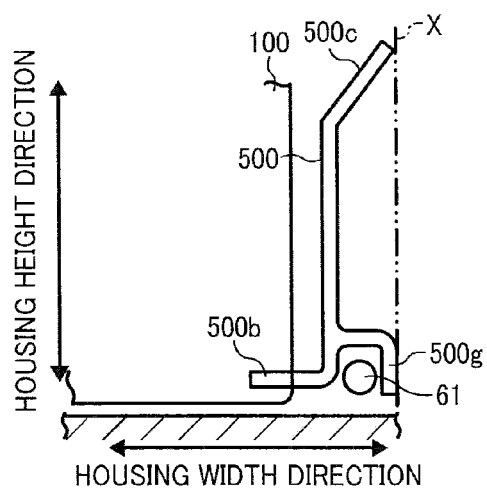

FIGS. 6A and 6B are cross-sectional views of the container 500 in a third embodiment of the present invention.

FIG. 6A shows a case in which a positioning part of the cable 61 is disposed at an external side of the container 500, that is, at an opposite side of the apparatus housing 100. Such a configuration makes it easier for the leaflet 510 to be inserted from above to the container 500. With this configuration, a loading part 500f of the container 500 is extended and disposed at a side opposite the loading part 500b disposed at the side of the apparatus housing 100. In the illustrated example of FIG. 6A, the loading part 500f is formed into a downward convex shape with an upper side open so that the cable 61 can be placed easily, thereby improving workability in attachment. It is preferred that an outermost end of the loading part 500f be not beyond an upper part 500c of the container 500 as illustrated by a line X in FIG. 6A from a viewpoint not to increase the installation area or the projected area.

As illustrated in FIG. 6B, contrary to the case of FIG. 6A, a loading part 500g is configured into a bent shape opening downward and the cable 61 is inserted from underneath. In this configuration, vertical waving of the cable 61 can be prevented. In this configuration, it is preferred that an outermost end of the loading part 500g be not beyond an upper part 500c of the container 500 as illustrated by a line X in FIG. 6B.

Fourth Embodiment

FIG. 7 is a cross-sectional view of the container 500 in a fourth embodiment of the present invention. In the configuration as illustrated in FIG. 7, the container 500 is formed over the entire width of the side surface of the apparatus housing 100 and covers the cable 61 along the longitudinal direction of the cable 61 according to any one of the configurations as described above. The container 500 may be divided in parts in the longitudinal direction of the cable 61 so that each part may be related to the cable 61 partly.

Although preferred embodiments have been described using a serial-type inkjet printer, the present invention is not limited thereto and is applicable, for example, to an image forming apparatus employing electrophotography. In this patent specification, the term "sheet" is not limited to paper material but also includes an OHP sheet and any material on which ink droplets or any other recording agent can be adhered or fixed.

Additional modifications and variations of the present invention are possible in light of the above teachings. It is therefore to be understood that, within the scope of the appended claims, the invention may be practiced other than as specifically described herein.

What is claimed is:

1. An image forming apparatus, comprising:
an apparatus housing;
a container disposed on an external side surface of the apparatus housing, the container including a loading part that extends through the external side surface in a width direction of the apparatus housing; and including a guide part that extends from the loading part in a height direction of the apparatus housing;
a guide groove in the external side surface with a depth in the width direction of the apparatus housing and a length in the height direction of the apparatus housing; and
a cable that extends from an interior of the apparatus and within the guide groove,
wherein the external side surface, the guide part, and the loading part define a space through which the cable passes from the guide groove.

2. The image forming apparatus as claimed in claim 1, wherein the guide part is formed over an entire area in a length direction of the side surface of the apparatus housing so as to cover the cable along a longitudinal direction of the cable.

3. The image forming apparatus as claimed in claim 1, wherein the guide part formed by extending downward from a part of the container serves as a regulation part to regulate movement of the cable.

4. The image forming apparatus as claimed in claim 3, wherein an end portion of the regulation part is bent upward from a part of the container to support the cable from below.

5. The image forming apparatus as claimed in claim 3, wherein the guide part is formed over an entire area in a length direction of the side surface of the apparatus housing so as to cover the cable along a longitudinal direction of the cable.

6. The image forming apparatus as claimed in claim 1, further comprising a divider disposed above the loading part so as to divide a space inside the container,
wherein the cable is contained between the divider and a bottom of the loading part.

7. The image forming apparatus as claimed in claim 6, wherein the guide part is formed over an entire area in a length direction of the side surface of the apparatus housing so as to cover the cable along a longitudinal direction of the cable.

8. The image forming apparatus as claimed in claim 1, wherein the guide part is an upwardly open loading part on which the cable is settable from above.

9. The image forming apparatus as claimed in claim 8, wherein the guide part is formed over an entire area in a length direction of the side surface of the apparatus housing so as to cover the cable along a longitudinal direction of the cable.

10. The image forming apparatus as claimed in claim 1, wherein the guide part is a downwardly open retainer part into which the cable is insertable from below.

11. The image forming apparatus as claimed in claim 1, wherein the space is open in a length direction of the side surface of the apparatus housing.

12. The image forming apparatus as claimed in claim 1, wherein the loading space and the guide part are each so dimensioned in a length direction of the apparatus housing to contain an operation manual.

13. The image forming apparatus as claimed in claim 1, wherein the container orients the cable in a length direction of the apparatus housing.

14. An electronic device, comprising:
an apparatus housing;
a container disposed on an external side surface of the apparatus housing, the container including a loading part that extends through the external side surface towards a width direction of the apparatus housing, and a guide part that extends from the loading part in a height direction of the apparatus housing;
a guide groove in the external side surface with a depth in the width direction of the apparatus housing and a length in the height direction of the apparatus housing; and
a cable that extends from an interior of the apparatus housing and within the guide groove,
wherein the external side surface, the guide part, and the loading part define a space through which the cable passes from the guide groove.

* * * * *